US011985486B2

(12) United States Patent
Zhang

(10) Patent No.: US 11,985,486 B2
(45) Date of Patent: May 14, 2024

(54) SOUND SIGNAL PROCESSING METHOD, APPARATUS AND DEVICE BASED ON MICROPHONE ARRAY

(71) Applicant: Weifang Goertek Microelectronics Co., Ltd., Shandong (CN)

(72) Inventor: Xiaohong Zhang, Shandong (CN)

(73) Assignee: Weifang Goertek Microelectronics Co., Ltd., Shandong (CN)

( * ) Notice: Subject to any disclaimer, the term of this patent is extended or adjusted under 35 U.S.C. 154(b) by 193 days.

(21) Appl. No.: 17/615,233

(22) PCT Filed: Sep. 29, 2019

(86) PCT No.: PCT/CN2019/108940

§ 371 (c)(1),
(2) Date: Nov. 30, 2021

(87) PCT Pub. No.: WO2020/237953

PCT Pub. Date: Dec. 3, 2020

(65) Prior Publication Data

US 2022/0232318 A1 Jul. 21, 2022

(30) Foreign Application Priority Data

May 31, 2019 (CN) ........................ 201910470619.1

(51) Int. Cl.
*H04R 3/00* (2006.01)
*H04R 1/40* (2006.01)
*H04R 3/04* (2006.01)

(52) U.S. Cl.
CPC ............. *H04R 3/005* (2013.01); *H04R 1/406* (2013.01); *H04R 3/04* (2013.01); *H04R 2201/401* (2013.01)

(58) Field of Classification Search
CPC .......... H04R 3/005; H04R 1/406; H04R 3/04; H04R 2201/401
(Continued)

(56) References Cited

U.S. PATENT DOCUMENTS 9,826,599 B2 * 11/2017 Banta .................... H04L 12/282
10,757,214 B2 * 8/2020 Wouhaybi ............. G06F 11/302
(Continued)

FOREIGN PATENT DOCUMENTS

CN 106658329 A 5/2017
CN 109360579 A 2/2019
CN 110234043 A 9/2019

*Primary Examiner* — Disler Paul
(74) *Attorney, Agent, or Firm* — Baker Botts, LLP

(57) ABSTRACT

Disclosed are a microphone array-based sound signal processing method, apparatus and device. The method comprises: selecting, from a microphone array, a target microphone combination which is used for receiving a sound signal of a target sound source, the target microphone combination comprising a first microphone and at least one second microphone; obtaining target compensation information corresponding to the target microphone combination, the target compensation information comprising a signal compensation parameter of each second microphone with respect to the first microphone; according to the target compensation information, performing signal compensation processing on a second sound signal received by means of the second microphone; and according to the second sound signal subjected to the signal compensation processing and a first sound signal received by means of the first microphone, obtaining a target sound signal and outputting same.

8 Claims, 6 Drawing Sheets

(58) Field of Classification Search
USPC .................................................... 381/91–92
See application file for complete search history.

(56) References Cited

U.S. PATENT DOCUMENTS 10,805,575 B2 * 10/2020 Rudberg .................. H04R 5/04
11,601,764 B2 * 3/2023 Benattar ................ H04R 25/43
11,785,383 B2 * 10/2023 Fan ...................... H04R 29/005
381/92

* cited by examiner

SOUND SIGNAL PROCESSING METHOD, APPARATUS AND DEVICE BASED ON MICROPHONE ARRAY

This application claims priority to Chinese Patent Application No. 201910470619.1, filed with the CNIPA on May 31, 2019 and entitled "SOUND SIGNAL PROCESSING METHOD, APPARATUS AND DEVICE BASED ON MICROPHONE ARRAY", the content of which is hereby incorporated by reference in its entirety.

TECHNICAL FIELD

The present disclosure relates to the technical field of signal processing, and specifically to a sound signal processing method, apparatus and device based on a microphone array.

BACKGROUND

At present, a microphone array including multiple microphones is typically provided in a sound recognition system (such as a smart speaker system). According to the incident directions of the sound waves of sound signals transmitted from a sound source to the microphone array, corresponding multiple microphones in the microphone array may be called to receive the sound signals in corresponding directions, and perform a beamforming process on the multiple sound signals received by the multiple microphones, so as to filter out noise signals in other directions and improve sound recognition rate.

However, a microphone array usually needs to be provided on a plane parallel to a user used plane in order to form a planar array, and ensure that there is no obstacle to sound wave propagation during receiving the sound signals. In this way, the expected signal processing effect can be achieved when the microphone array is called to process the sound signals.

In practical applications, a microphone array is usually limited by the structure or appearance of the product on which it is installed, and has an obstacle structure between microphones therein for hindering the propagation of sound waves. For example, the product needs to set up components such as a display screen on a plane parallel to the user used plane, so there is no space for setting up the microphone array and the microphones in the microphone array need to be set on a side or bottom of the product, which causes that there is an obstacle structure formed by other parts of the product between the microphones in the microphone array. Correspondingly, when receiving sound signals, the microphone array will be affected by sound wave diffraction or sound wave reflection caused by the obstacle structure, and the signal difference between the sound signals received by each microphone can no longer meet the difference between the sound signals received by the planar array, which affects the effect of beamforming processing on the sound signals based on the microphone array and reduces the sound recognition rate.

SUMMARY

An object of the present disclosure is to provide a new technical solution for processing sound signal based on a microphone array.

According to a first aspect of the present disclosure, a sound signal processing method based on a microphone array is provided and comprises:

selecting from the microphone array a target microphone group for receiving a sound signal from a target sound source; the target microphone group including a first microphone and at least one second microphone;

acquiring target compensation information corresponding to the target microphone group, the target compensation information including a signal compensation parameter of each second microphone relative to the first microphone;

performing signal compensation processing on a second sound signal received by the second microphone according to the target compensation information;

acquiring and outputting a target sound signal according to the second sound signal which has undergone the signal compensation processing and a first sound signal received by the first microphone.

According to a second aspect of the present disclosure, a sound signal processing apparatus based on a microphone array is provided and comprises:

a group selection unit configured to select a target microphone group from the microphone array for receiving a sound signal from a target sound source, the target microphone group including a first microphone and at least one second microphone;

a compensation acquisition unit configured to acquire target compensation information corresponding to the target microphone group; the target compensation information includes a signal compensation parameter of each second microphone relative to the first microphone;

a compensation processing unit configured to perform signal compensation processing on a second sound signal received by the second microphone according to the target compensation information; and a signal outputting unit configured to acquire and output a target sound signal according to the second sound signal which has undergone the signal compensation processing and a first sound signal received by the first microphone.

According to a third aspect of the present disclosure, a sound signal processing apparatus based on a microphone array is provided and comprises:

a memory configured to store executable instructions; and a processor configured to execute the sound signal processing method based on the microphone array of any one of the first aspect under control of the executable instructions.

According to a fourth aspect of the present disclosure, a sound signal processing device is provided and comprises:

a microphone array; and the sound signal processing apparatus based on the microphone array of the second or the third aspect.

According to an embodiment of the present disclosure, for the microphone group configured to receive sound signals in the microphone array, by acquiring the signal compensation information corresponding to the microphone group and performing targeted signal compensation processing on each sound signal received by the microphone group, it is possible to eliminate the effect of sound wave diffraction or reflection caused by the obstacle structure between the microphones in the microphone group, so that the signal difference between the sound signals received by each microphone in the microphone group can satisfy the difference between the various sound signals received by the planar array, thus ensuring the performance of the sound signal processing (such as beamforming processing) based on the microphone array and correspondingly improving the sound recognition rate.

Other features and advantages of the present disclosure will become apparent from the detailed description for exemplary embodiments of the present disclosure with reference to the following accompanying drawings.

DESCRIPTIONS OF THE DRAWINGS

The accompanying drawings incorporated in and constituting a part of the specification illustrate embodiments of present disclosure and together with the description thereof, serve to explain the principles of the disclosure.

DETAILED DESCRIPTION OF EMBODIMENTS

Figure 1:
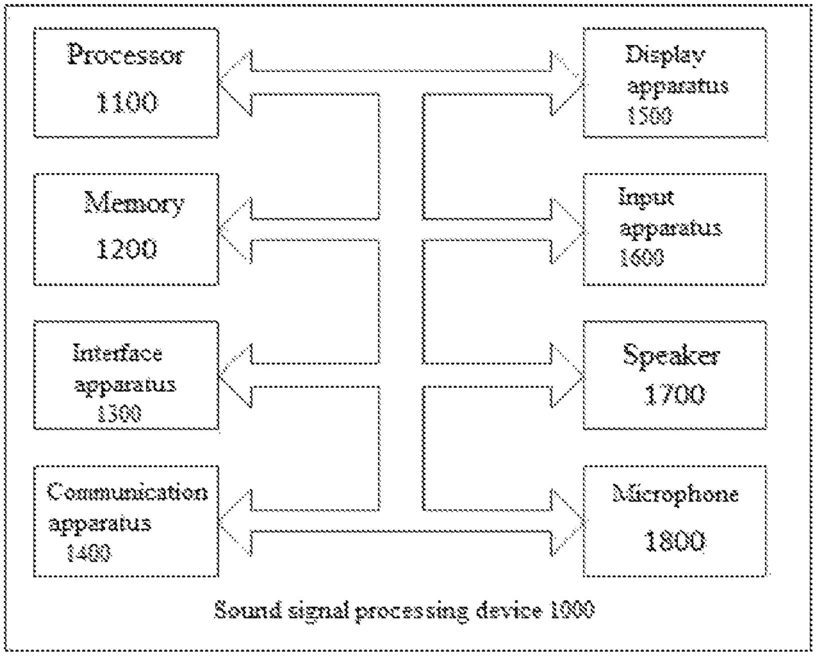
FIG. 1 is a block diagram showing an example of a hardware configuration of a sound signal processing device that may be configured to implement an embodiment of present disclosure.

In order to make the purpose, technical solutions and advantages of the embodiments of this disclosure clearer, technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

The following description of at least one exemplary embodiment is in fact merely illustrative and is in no way intended as a limitation to the present disclosure and its application or use.

Technologies, methods and devices known to those of ordinary skill in the related field may not be discussed in detail; however, the technologies, methods and devices should be regarded as a part of the specification where appropriate.

In all examples shown and discussed herein, any specific value should be interpreted as merely exemplary rather than a limitation. Therefore, other examples of the exemplary embodiments may have different values.

It should be noted that similar reference numerals and letters represent similar items in the accompanying drawings below. Therefore, once an item is defined in one drawing, it is unnecessary to further discuss the item in the subsequent drawings.

<Hardware Configuration>

FIG. 1 is a block diagram showing a hardware configuration of a sound signal processing device 1000 that may be configured to implement an embodiment of present disclosure.

The sound signal processing device 1000 may be a smart device such as a smart speaker or a TV box with a microphone array. As shown in FIG. 1, the sound signal processing device 1000 may comprise a processor 1100, a memory 1200, an interface apparatus 1300, a communication apparatus 1400, a display apparatus 1500, an input apparatus 1600, a speaker 1700, a microphone 1800, and the like. Wherein, the processor 1100 may be a central processing unit CPU, a microprocessor MCU, and the like. The memory 1200 comprises, for example, a ROM (read only memory), a RAM (random access memory), a nonvolatile memory such as a hard disk, and the like. The interface apparatus 1300 comprises, for example, a USB interface, an earphone interface, and the like. The communication apparatus 1400 can perform wired or wireless communication, for example, and can specifically comprise Wifi communication, Bluetooth communication, 2G/3G/4G/5G communication, and the like. The display apparatus 1500 is, for example, a liquid crystal display screen, a touch display screen, and the like. The input apparatus 1600 may comprises, for example, a touch screen, a keyboard, and motion sensing input. The speaker 1700 and the microphone 1800 can be used by a user to input/output voice information.

The sound signal processing device shown in FIG. 1 is merely illustrative and in no way means any limitation on present disclosure as well as application or use thereof. Applied to the embodiment of present disclosure, the memory 1200 of the sound signal processing device 1000 is configured to store instructions, which are configured to control the processor 1100 for operation to execute any method for processing sound signals based on a microphone army provided by the embodiment of present disclosure. Those skilled in the art should understand that although a plurality of apparatuses are illustrated for the sound signal processing device 1000 in FIG. 1, only some of them may be involved in present disclosure, for example, the sound signal processing device 1000 only involving the processor 1100 and the storage apparatus 1200. Technicians can design instructions according to a scheme disclosed in present disclosure. How the instruction controls the operation of the processor is well known in the art, and thus will not be described in detail here.

Embodiments of the Method

The present embodiment provides a sound signal processing method based on a microphone array. The microphone array may be an array formed by arranging a group of onmidirectional microphones located at different positions in the space according to a certain layout rule. For example, the microphone array may be a planar array. Through the microphone array, a sound signal propagating in space can be spatially sampled.

Figure 2:
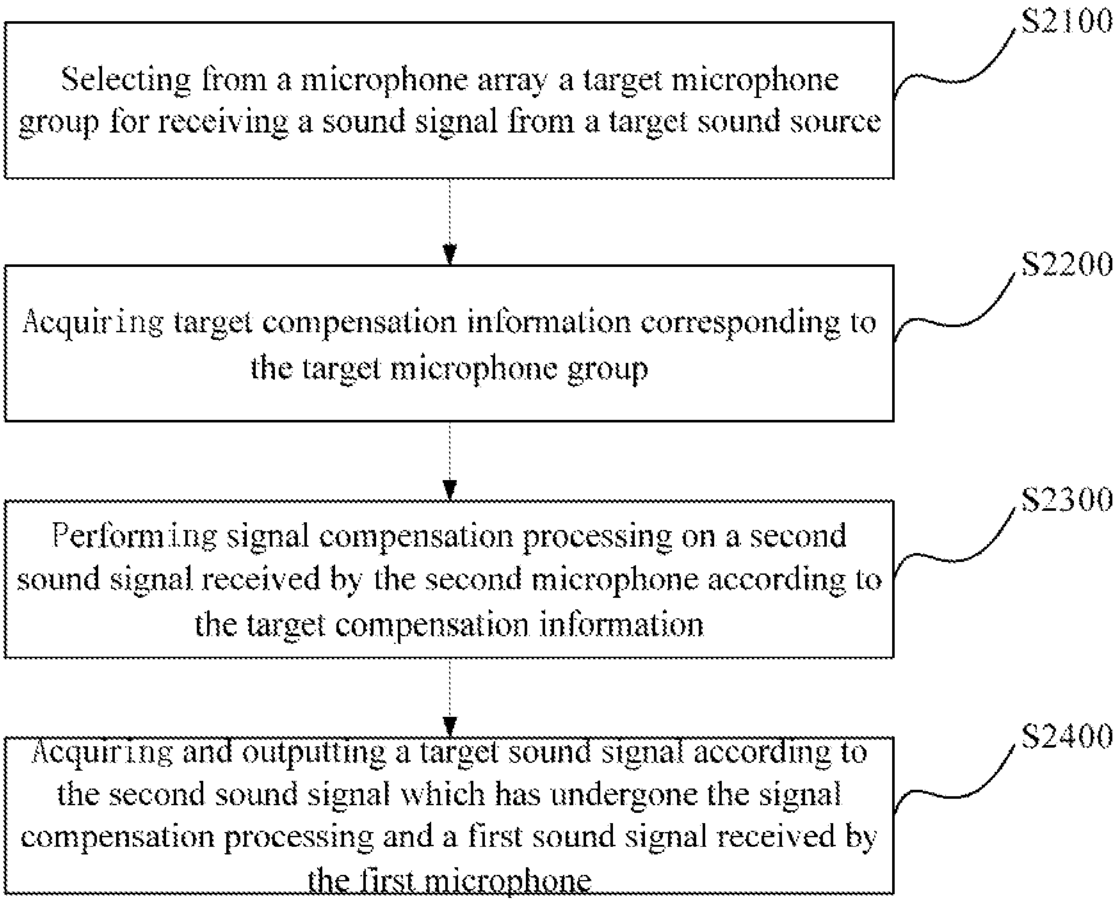
FIG. 2 is a schematic flowchart of a sound signal processing method based on a microphone array according to an embodiment of the present disclosure.

As shown in FIG. 2, the sound signal processing method may include the following steps S2100-S2400.

Step S2100: selecting from a microphone array a target microphone group for receiving a sound signal from a target sound source.

The microphone array includes a plurality of microphones arranged according to a preset rule. By combining different microphones among the microphone array, the sound signal can be received in a specific direction to acquire the best sound signal reception effect. The target microphone group is used for receiving the sound signal from the target sound source, and is a microphone group that can acquire the best target sound signal reception effect.

The target microphone group includes a first microphone and at least one second microphone. In the target microphone group, the number of the second microphone may be selected according to a specific microphone array layout, and may be one or more.

In a specific example, the step S2100 of selecting from the microphone array a target microphone group for receiving the sound signal from a target sound source from the microphone array may include the following steps S2110-S2120.

S2110: determining the incident direction of the sound wave from the target sound source according to the initial sound signal from the target sound source received by the microphone array.

In this embodiment, the initial sound signal is the sound signal emitted by the target sound source. The initial sound signal may be voice of an awakening device, etc.

The incident direction of the sound wave from the target sound source is the incident direction of the initial sound signal propagating to the microphone array.

The subsequent steps can be combined to determine the incident direction of the sound wave from the target sound source. By selecting from the microphone array the target microphone group corresponding to the incident direction of the sound wave from the target sound source so as to ensure that the target sound signal can be received by the target microphone group, the best signal receiving effect can be acquired.

The step S2110 of determining the incident direction of the sound wave from the target sound source may include step S2111*a*.

Step S2111*a*: acquiring the received signal strength of the initial sound signal received by each microphone in the microphone array; selecting the sound wave propagation direction corresponding to the maximum received signal strength to be the incident direction of the sound wave.

Selecting the sound wave propagation direction corresponding to the maximum received signal strength to be the incident direction of the sound wave can quickly acquire the incident direction of the sound wave to select the target microphone group, which is simple and efficient to implement, and is particularly suitable for situations where the target sound signal is a near-field sound signal and the signal strength of the target sound signal received by each microphone has a large difference. The near-field sound signal refers to the sound signal received by each microphone in the microphone array when the microphone array is in a near-field environment. Generally, the environment where the distance from the target sound source to the center reference point of the microphone array is much smaller than the wavelength of the sound signal is called the near-field environment.

Alternatively, the step S2110 of determining the incident direction of the sound wave from the target sound source may include step S2111*b*.

S2111*b*: performing beamforming processing on the initial sound signal received by each microphone in the microphone array to acquire multiple initial sound beams; and selecting the sound wave propagation direction corresponding to the initial sound beam with the maximum signal strength to be the incident direction of the sound wave.

Selecting the sound wave propagation direction acquired by performing beamforming processing on the initial sound signal and corresponding to the initial sound beam with the maximum signal strength to be the incident direction of the sound wave, can accurately acquire the incident direction of the sound wave to select the target microphone group, and effectively guarantee the performance of receiving the target sound signal according to the target microphone group, which is particularly suitable for situations where the target sound signal is a far-field sound signal and the signal strength of the target sound signal received by each microphone has a small difference. The far-field sound signal refers to the sound signal received by each microphone in the microphone array when the microphone array is in a far-field environment. Generally, the environment where the distance from the target sound source to the center reference point of the microphone array is much larger than the wavelength of the sound signal is called the far-field environment.

Step S2120: selecting the first microphone and the second microphone corresponding to an incident direction of the sound wave from the microphone array, thereby acquiring the target microphone group.

By selecting from the microphone array the target microphone group corresponding to the incident direction of the sound wave from the target sound source so as to ensure that the target sound signal can be received by the target microphone group, the best signal receiving effect can be acquired.

After selecting the target microphone group for receiving the sound signal from the target sound source, proceed to:

Step S2200: acquiring target compensation information corresponding to the target microphone group.

For example, the target microphone group includes a first microphone and at least one second microphone. The target compensation information includes a signal compensation parameter of each second microphone relative to the first microphone. Each signal compensation parameter is a parameter for signal compensation for the sound signal received by the corresponding second microphone relative to the sound signal received by the first microphone. By using the signal compensation parameter to compensate the sound signal received by the second microphone, the signal difference can be avoided, which signal difference exists between the first microphone and the second microphone and cannot meet the demands for a planar array.

In a more specific example, the step S2200 of acquiring target compensation information corresponding to the target microphone group may include the following steps S2210-S2220.

Step 2210: acquiring a signal compensation information set of the microphone array.

The signal compensation information set includes signal compensation information of each microphone group selectable in the microphone army.

The microphone group includes microphones as the first microphone and the second microphone respectively. The signal compensation information includes at least a signal compensation parameter of each second microphone in the microphone group relative to the first microphone.

In a more specific example, the step S2210 of acquiring a signal compensation information set of the microphone array may further include the following steps S2211-S2213.

Step 2211: determining all microphone groups that can be selected in the microphone array.

Figure 3:
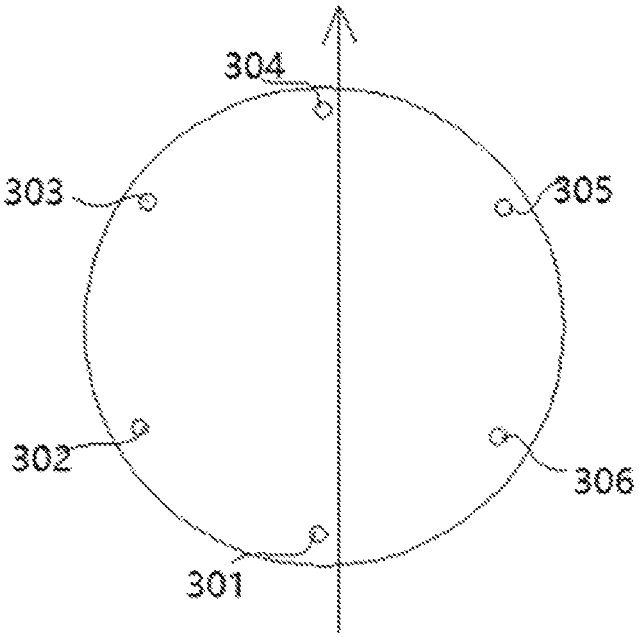
FIG. 3 is a schematic diagram of an example where the microphone array receives a sound signal from a target sound source in a free field environment.

For example, taking the microphone array shown in FIG. 3 as an example, the microphone array includes six microphones, namely a microphone 301, a microphone 302, a microphone 303, a microphone 304, a microphone 305, and a microphone 306. The microphone array may include three optional microphone groups. Specifically, a first microphone group includes the microphone 301 and the microphone 304, a second microphone group includes the microphone 302 and the microphone 305, and a third microphone group includes the microphone 303 and the microphone 306, and these three optional microphone groups may correspond to different sound wave incident directions.

Taking the first microphone group as an example to illustrate the signal compensation information of the microphone group, the microphone 301 is used as the first microphone and the microphone 304 is used as the second microphone, and the corresponding signal compensation information may include the signal compensation parameter of the microphone 304 relative to the microphone 301.

The signal compensation information corresponding to the first microphone group may also include a signal compensation parameter of the microphone 304 relative to the microphone 301 and a signal compensation parameter of the microphone 301 relative to the microphone 304.

Step 2212: acquiring, for each microphone group, a free transfer function and an obstacle transfer function of sound wave transmission from the first microphone to each second microphone of the microphone group.

A transfer function is a frequency response curve expressed in the form of a function. The frequency response curve is a curve drawn according to the response given by the signal transmission environment or the signal transmission system corresponding to the transfer function at different frequencies. Through the transfer function, a frequency domain signal energy corresponding to each input frequency point can be acquired. The frequency domain signal energy acquired by the transfer function can be expressed in dB form. Assuming that the transfer function is H(x), the frequency domain signal energy at frequency f is H(f), the corresponding dB form is 20 lg(H(f)), and the unit thereof is dB; or, the frequency domain signal energy dB can be expressed in non-dB form, and correspondingly, its value can be acquired through Fourier transform or other frequency transform.

The free transfer function is a transfer function corresponding to sound wave transmission from the first microphone to the second microphone of the microphone group in a free field environment.

The free field environment refers to an environment where there is no obstacle structure between the first microphone and the second microphone to hinder the propagation of sound waves. The free transfer function reflects the response given by the corresponding transmission path or transmission coefficient at different frequencies when the sound wave is transmitted from the first microphone to the second microphone in the free field environment.

For example, in the microphone array shown in FIG. 3, it is assumed that the first microphone group including the microphone 301 as the first microphone and the microphone 304 as the second microphone is the target microphone group, and the incident wave direction of the target sound source is as indicated by the arrow, then there is no obstacle structure for hindering the propagation of sound waves between the microphone 301 and the microphone 304, and both the microphone 301 and the microphone 304 are in the free field environment; and in the free field environment, the signal difference between the sound signals received by the microphone 301 and the microphone 304 can satisfy the difference between the sound signals received in the planar array. In this example, a device such as a signal detector may be configured to detect the sound signals of the same target sound source at different frequencies received by the microphone 301 and the microphone 304 in the free field environment, thereby acquiring the free transfer function.

The obstacle transfer function is a transfer function corresponding to the sound waves transmitting from the first microphone to the second microphone of the microphone group in an obstacle structure environment.

The obstacle structure environment refers to an environment in which there is no obstacle structure for hindering the propagation of sound waves between the first microphone and the second microphone. For example, the product needs to set up components such as a display screen on a plane parallel to the user used plane, so there is no space for setting up the microphone array and the microphones in the microphone array need to be set on a side or bottom of the product, which causes that there is an obstacle structure formed by other parts of the product between the microphones in the microphone array.

The obstacle transfer function reflects the response given by the corresponding transmission path or the transmission coefficient for different frequencies when the sound wave is transmitted from the first microphone to the second microphone in the obstacle structure environment.

Figure 4:
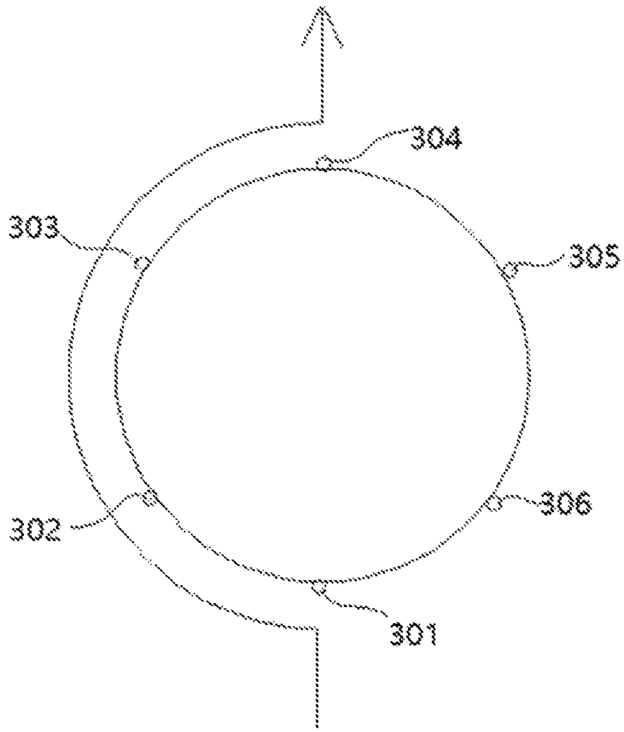
FIG. 4 is a schematic diagram of an example where the microphone array receives a sound signal from a target sound source in an environment with an obstacle structure.

For example, in the microphone array shown in FIG. 4, it is assumed that the first microphone group including the microphone 301 as the first microphone and the microphone 304 as the second microphone is the target microphone group, and the incident wave direction of the target sound source is as indicated by the arrow, then there is an obstacle structure for hindering the propagation of sound waves between the microphone 301 and the microphone 304, and both the microphone 301 and the microphone 304 are in the obstacle structure environment; and in the obstacle structure environment, the signal difference between the sound signals received by the microphone 301 and the microphone 304 cannot satisfy the difference between the sound signals received in the planar array. In this example, a device such as a signal detector may be configured to detect the sound signals of the same target sound source at different frequencies received by the microphone 301 and the microphone 304 in the obstacle structure environment, thereby acquiring the obstacle transfer function.

Step S2213: acquiring the signal compensation parameter of each second microphone in the microphone group relative to the first microphone as the signal compensation information of the microphone group, according to the free transfer function and the obstacle transfer function of each microphone group.

In this embodiment, the signal compensation parameter of each second microphone relative to the first microphone may be the difference between the obstacle transfer function and the free transfer function of each second microphone relative to the first microphone. The signal compensation parameter can compensate the signal difference caused by the influence of the obstacle structure between the second microphone and the first microphone on the sound wave propagation, so that the signal difference between the second microphone and the first microphone can meet the demands for the planar array, thus effectively guaranteeing the processing performance for subsequent sound signals.

After acquiring the signal compensation information corresponding to each microphone group, a signal compensation information set can be acquired.

By acquiring the signal compensation information set, in the process of receiving the sound signal by the microphone array, the corresponding target compensation information for any target microphone group can be quickly and efficiently acquired from the signal compensation information set. In this way, a targeted signal compensation is performed on each sound signal received by the target microphone group, so as to meet the demands for the planar array for the signal difference between the sound signals received in the microphone array, and improve the processing efficiency for the subsequent sound signals on the basis of ensuring the processing performance for the sound signals.

For example, taking the microphone array shown in FIG. 3 as an example, the microphone array includes six microphones, namely a microphone 301, a microphone 302, a microphone 303, a microphone 304, a microphone 305, and a microphone 306. The microphone array may include six optional microphone groups. Specifically, a first microphone group includes the microphone 301 as a first microphone and the microphone 304 as a second microphone, a second microphone group includes the microphone 302 as the first microphone and the microphone 305 as the second microphone, a third microphone group includes the microphone 303 as the first microphone and the microphone 306 as the second microphone, a fourth microphone group includes the microphone 301 as the second microphone and the microphone 304 as the first microphone, a fifth microphone group includes the microphone 302 as the second microphone and the microphone 305 as the first microphone, and a sixth microphone group includes the microphone 303 as the second microphone and the microphone 306 as the first microphone. These six optional microphone groups may correspond to different sound wave incident directions.

For the first microphone group where the microphone 301 acts as the first microphone and the microphone 304 acts as the second microphone, the corresponding signal compensation information may include the signal compensation parameter of the microphone 304 relative to the microphone 301. For example, the signal compensation parameter may be the difference $W=H-H_1$ between the free transfer function H and the obstacle transfer function $H_1$ of the microphone 304 relative to the microphone 301.

Similarly, for the second, third, fourth, fifth, and sixth microphone group, the corresponding signal compensation information can be acquired by a similar method, and when the signal compensation information of the first, second, third, fourth, fifth, and sixth microphone groups are finally acquired, the signal compensation information set of the microphone array can be correspondingly acquired.

Step 2220: selecting, from the signal compensation information set, signal compensation information corresponding to the target microphone group as target compensation information.

By acquiring the signal compensation information set, the corresponding target compensation information for a specific target microphone group can be quickly and efficiently acquired from the signal compensation information set and by combining the subsequent steps, a targeted signal compensation is performed on each sound signal received by the target microphone group, so as to meet the demands for the planar array for the signal difference between the sound signals received in the microphone array, and improve the processing efficiency for the subsequent sound signals on the basis of ensuring the processing performance for the sound signals.

After acquiring the target compensation information corresponding to the target microphone group, proceed to:

Step S2300: performing signal compensation processing on a second sound signal received by the second microphone according to the target compensation information.

In this embodiment, the target compensation information includes a signal compensation parameter of the second microphone in the target microphone group relative to the first microphone. For example, the signal compensation parameter may be the difference between the free transfer function and the obstacle transfer function of the second microphone relative to the first microphone.

Performing signal compensation processing on the second sound signal received by the second microphone according to the target compensation information, can make the second sound signal which has undergone the signal compensation processing avoid the influence caused by the obstacle structure existing between the second microphone and the first microphone; and the signal difference between the second sound signal and the first sound signal received by the first microphone meets the demands for the planar array for the signal difference between the sound signals, effectively guarantees the processing performance of the subsequent sound signals received by the first and second microphones, and accordingly improves the sound recognition rate.

It should be understood that, in the case where the target microphone group includes a first microphone and a plurality of second microphones, performing signal compensation processing on the second sound signals received by the second microphones may be that the signal compensation processing is performed on the second sound signal received by each second microphone respectively.

In a more specific example, the step S2300 of performing signal compensation processing on the second sound signal received by the second microphone according to the target compensation information, may include:

performing frequency compensation on a frequency domain signal of the second sound signal according to the signal compensation parameter, thereby acquiring the second sound signal which has undergone the compensation processing.

For example, it is assumed that the signal compensation parameter of the second microphone relative to the first microphone is the difference $W=H-H_1$ between the free transfer function H and the obstacle transfer function $H_1$ of the second microphone relative to the first microphone, and the difference can be expressed in dB, performing frequency compensation on the frequency domain signal of the second sound signal can add the dB form of the spectrum signal of the second sound signal to the corresponding signal compensation parameter W. For example, a filter can be designed for the signal compensation parameter W, and W can be added to the second sound signal in the form of the filter.

Alternatively, it is assumed that the signal compensation parameter of the second microphone relative to the first microphone is the difference $W=H-H_1$ between the free transfer function H and the obstacle transfer function $H_1$ of the second microphone relative to the first microphone, and the difference may be in non-dB form, performing frequency compensation on the frequency domain signal of the second sound signal is specifically to multiply the frequency domain signal (in non-dB form) of the second sound signal by the signal compensation parameter in the frequency domain. Specifically, it can be implemented by setting parameters of the corresponding filter or equalizer according to the signal compensation parameter.

Performing signal compensation processing on the second sound signal received by the second microphone can make the second sound signal which has undergone the signal compensation processing avoid the influence caused by the obstacle structure existing between the second microphone and the first microphone; and the signal difference between the second sound signal and the first sound signal received by the first microphone meets the demands for the planar array for the signal difference between the sound signals, effectively guarantees the processing performance of the subsequent sound signals received by the first and second microphones, and accordingly improves the sound recognition rate.

After performing signal compensation processing on the second sound signal received by the second microphone, proceed to:

Step S2400: acquiring and outputting the target sound signal according to the second sound signal which has undergone the signal compensation processing and the first sound signal received by the first microphone.

In a more specific example, the step 2400 of acquiring and outputting the target sound signal according to the second sound signal which has undergone signal compensation processing and the first sound signal received by the first microphone, may include: a step 2410.

Step 2410: performing beamforming processing on the second sound signal which has undergone signal compensation processing and the first sound signal received by the first microphone, thereby acquiring and outputting the target sound signal.

In this example, based on the stable transmission speed of sound waves and the fixed relative distance between the microphones in the microphone array, and with the use of the time difference and phase difference when the sound signal is transmitted to the two microphones in the microphone array respectively to extract and merge the more correlated parts of the sound signals received by the two microphones, a beamforming algorithm can enhance the sound signal and reduce the signal noise.

The second sound signal which has undergone the signal compensation processing has avoided the influence caused by the obstacle structure existing between the second microphone and the first microphone; and the signal difference between the second sound signal and the first sound signal received by the first microphone meets the demands for the planar array for the signal difference between the sound signals. On this basis, by performing beamforming processing on the first sound signal received by the first microphone, it is possible to effectively enhance the sound signal and reduce noise thereof, guarantee the signal performance of the output target sound signal, and accordingly improves the sound recognition rate.

In a more specific example, the step 2400 of acquiring and outputting the target sound signal according to the second sound signal which has undergone signal compensation processing and the first sound signal received by the first microphone, may include: a step 2420.

Step 2420: performing signal de-compensation processing on a sound signal acquired through the beamforming processing according to the target compensation information, thereby acquiring and outputting the target sound signal.

For example, the target compensation information includes a signal compensation parameter of the second microphone relative to the first microphone, and the signal compensation parameter is expressed in dB. The signal compensation processing is to add the dB form of the signal compensation parameter to the dB form of the frequency domain signal of the second sound signal from the second microphone. Correspondingly, performing a signal de-compensation processing on the sound signal acquired after beamforming processing according to the target compensation information, can subtract the corresponding signal compensation parameter from the dB form of the frequency domain signal of the sound signal acquired after beamforming processing.

Alternatively, the signal compensation parameter is expressed in a non-dB form, and the signal compensation processing is to multiply the frequency domain signal of the second sound signal from the second microphone by the signal compensation parameter in the frequency domain. Correspondingly, performing the signal de-compensation processing on the sound signal acquired after beamforming processing according to the target compensation information, can divide the frequency domain signal of the sound signal acquired after beamforming processing by the corresponding signal compensation parameter.

The foregoing specific implementation of the signal de-compensation processing can be accomplished by setting a corresponding filter or equalizer according to the signal compensation parameters included in the target compensation information.

By performing frequency removal compensation on the sound signal acquired after beamforming processing of the first and second sound signals, it is possible to eliminate overcompensation that may occur in the compensation processing on the second sound signal before the beamforming processing, and effectively guarantee the performance of the output sound signal.

The sound signal processing method based on the microphone array provided by the embodiments of the present disclosure has been described above with reference to the accompanying drawings. For the microphone group configured to receive sound signals in the microphone array, by acquiring the signal compensation information corresponding to the microphone group and performing targeted signal compensation processing on each sound signal received by the microphone group, it is possible to eliminate the effect of sound wave diffraction or reflection caused by the obstacle structure between the microphones in the microphone group, so that the signal difference between the sound signals received by each microphone in the microphone group can satisfy the difference between the various sound signals received by the planar array, thus ensuring the performance of the sound signal processing (such as beamforming processing) based on the microphone array and correspondingly improving the sound recognition rate.

Example

Figure 5:
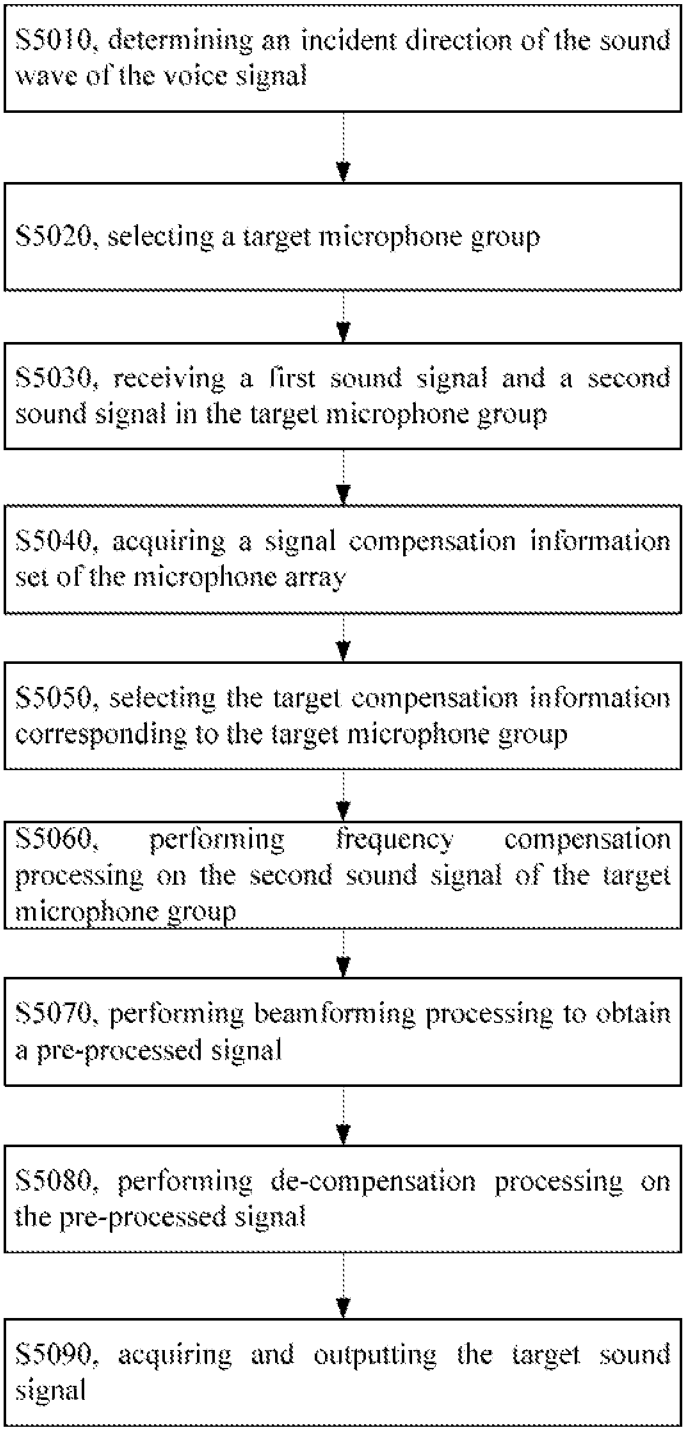
FIG. 5 is a schematic flowchart of a sound signal processing method based on a microphone array according to an example of the present disclosure.

The sound signal processing method based on the microphone array provided in this embodiment will be further described below in conjunction with FIG. 5.

In this example, taking the microphone array shown in FIG. 4 as an example, the microphone array includes six microphones forming a coaxial circular array, namely a microphone 301, a microphone 302, a microphone 303, a microphone 304, a microphone 305, and a microphone 306. As shown in FIG. 4, the microphone array receives sound signals in an obstacle structure environment, and the signal difference between the sound signals received by each microphone can no longer satisfy the difference between the sound signals received in the planar array, which affects the effect of subsequent processing (such as beamforming processing) on the voice signal received by the microphone.

The sound signal processing method may include the following steps: step S5010-step S5090.

Step S5010: determining an incident direction of the sound wave of the voice signal according to the voice signal of the wake-up device received by the microphone array.

Step S5020: selecting a first microphone group composed of the microphone 301 and the microphone 304 corresponding to the incident direction of the sound wave of the voice signal as a target microphone group.

Wherein, the microphone 301 is a first microphone, and the microphone 304 is a second microphone.

Step S5030: receiving the first sound signal received by the microphone 301 and the second sound signal received by the microphone 304 in the target microphone group.

Step S5040: acquiring a signal compensation information set of the microphone array, wherein the signal compensation information set includes signal compensation information corresponding to the first microphone group, a second microphone group, and a third microphone group.

Step S5050: selecting the target compensation information corresponding to the target microphone group from the signal compensation information set, wherein the target compensation information includes a signal compensation parameter W of the microphone 304 relative to the microphone 301.

Step S5060: performing frequency compensation processing on the frequency domain signal of the second sound signal received by the microphone 304 according to the target compensation information being the signal compensation parameter W of the microphone 304 relative to the microphone 301 to acquire a frequency-compensated second sound signal.

Step S5070: performing beamforming processing on the frequency-compensated second sound signal and the first sound signal received by the microphone 301 to acquire a pre-processed signal.

Step S5080: performing de-compensation processing on the pre-processed signal according to the target compensation information.

Step S5090: acquiring and outputting the target sound signal.

In this example, for the target microphone group configured to receive the sound signal from the target sound source, by acquiring the signal compensation parameters of the second microphone in the microphone group relative to the first microphone, and performing targeted signal compensation processing on the second sound signal received by the second microphone in the target microphone group, it is possible to eliminate the effect of sound wave diffraction or reflection caused by the obstacle structure between the first and second microphones in the microphone group, so that the signal difference between the sound signals received by each microphone in the microphone group can satisfy the difference between the various sound signals received by the planar array, thus ensuring the performance of the sound signal processing (such as beamforming processing) based on the microphone array and correspondingly improving the sound recognition rate.

<Sound Signal Processing Apparatus Based on a Microphone Array>

Figure 6:
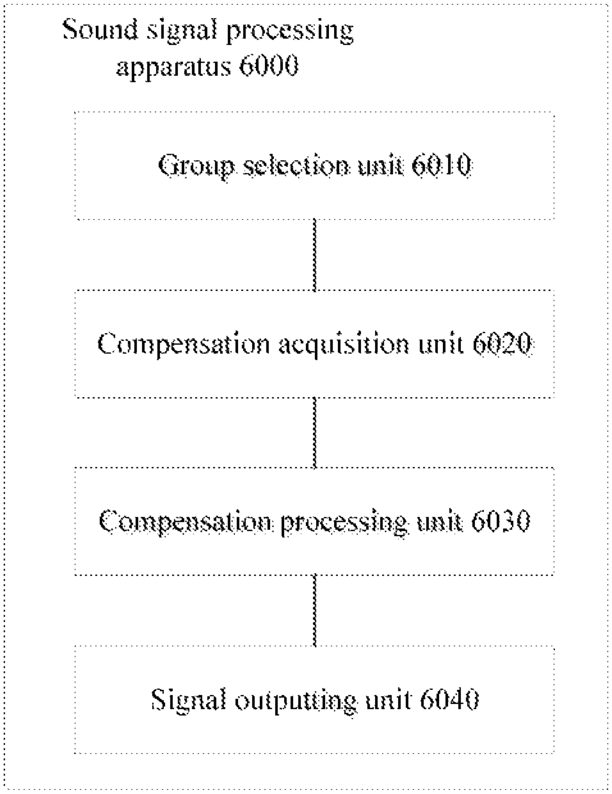
FIG. 6 is a schematic diagram of a hardware structure of a sound signal processing apparatus based on a microphone array according to an embodiment of the present disclosure.

In this embodiment, a sound signal processing apparatus 6000 based on a microphone array is also provided, as shown in FIG. 6. The sound signal processing apparatus 6000 may include a group selection unit 6010, a compensation acquisition unit 6020, a compensation processing unit 6030, and a signal outputting unit 6040, for implementing the sound signal processing method provided in this embodiment which will not be repeated herein.

The group selection unit 6010 may be configured to select from the microphone array a target microphone group for receiving the sound signal from a target sound source; the target microphone group includes a first microphone and at least one second microphone.

In this embodiment, the group selection unit 6010 may include an incident direction determination sub-unit 6011 and a target group determination sub-unit 6012.

The incident direction determination sub-unit 6011 may be configured to determine the incident direction of the sound wave from the target sound source according to the initial sound signal from the target sound source received by the microphone array.

The target group determination sub-unit 6012 may be configured to select the first microphone and the second microphone corresponding to the incident direction of the sound wave from the microphone array to acquire the target microphone group.

The compensation acquisition unit 6020 may be configured to acquire target compensation information corresponding to the target microphone group.

The target compensation information includes the signal compensation parameter of each second microphone relative to the first microphone.

In this embodiment, the compensation acquisition unit 6020 may include a compensation set acquisition sub-unit 6021 and target compensation information selection sub-unit 6022.

The compensation set acquisition sub-unit 6021 may be configured to acquire a signal compensation information set of the microphone array.

Wherein, the signal compensation information set includes the signal compensation information of each microphone group selectable in the microphone array; the microphone group includes the microphones as the first microphone and the second microphone respectively; the signal compensation information includes at least the signal compensation parameter of the second microphone relative to the first microphone of the microphone group.

In a more specific example, the compensation set acquiring sub-unit 6021 may include:

a unit that may be configured to determine all the microphone groups selectable in the microphone array;

a unit that may be configure for each microphone group to acquire a free transfer function and an obstacle transfer function of sound wave transmission from the first microphone to each second microphone of the microphone group;

a unit that may be configured to acquire the signal compensation parameter of each second microphone in the microphone group relative to the first microphone as the signal compensation information of the microphone group according to the free transfer function and the obstacle transfer function of each microphone group, thereby acquiring a signal compensation information set including signal compensation information of each microphone group.

The target compensation information selection sub-unit 6022 may be configured to select, from the signal compensation information set, the signal compensation information corresponding to the target microphone group as the target compensation information.

The compensation processing unit 6030 may be configured to perform signal compensation processing on the second sound signal received by the second microphone according to the target compensation information.

In a more specific example, the compensation processing unit 6030 includes a sub-unit that may be configured to perform frequency compensation on a frequency domain signal of the second sound signal according to the signal compensation parameter to acquire the second sound signal which has undergone the compensation process.

The signal outputting unit 6040 may be configured to acquire and output the target sound signal according to the second sound signal which has undergone the signal compensation processing and the first sound signal received by the first microphone.

In a more specific example, the compensation processing unit 6030 includes a sub-unit that may be configured to perform beamforming processing on the second sound signal which has undergone the signal compensation processing and the first sound signal received by the first microphone, thereby acquiring and outputting the target sound signal.

In a more specific example, the compensation processing unit 6030 further includes a sub-unit that may be configured to perform signal de-compensation processing on the sound signal acquired through the beamforming processing according to the target compensation information, thereby acquiring and outputting the target sound signal.

Those skilled in the art should understand that the sound signal processing apparatus 6000 based on the microphone array can be implemented in various ways. For example, the sound signal processing apparatus 6000 based on the microphone array can be implemented by configuring the processor with instructions. For example, the instructions can be stored in an ROM, and when an equipment is started, the instructions are read from the ROM into a programmable device to realize the sound signal processing apparatus 6000 based on the microphone array. For example, the sound signal processing apparatus 6000 based on the microphone array may be solidified into a dedicated device (such as an ASIC). The sound signal processing apparatus 6000 based on a microphone array can be implemented by being divided into mutually independent units, or by combining the mutually independent units. The sound signal processing apparatus 6000 based on the microphone array may be implemented by one of the foregoing various implementations, or may be implemented by a combination of two or more of the foregoing various implementations.

Figure 7:
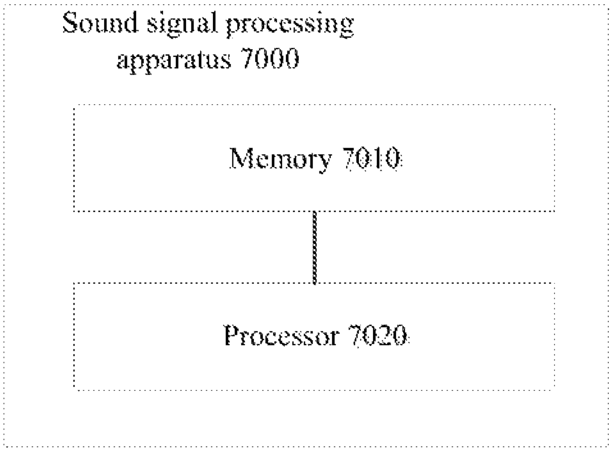
FIG. 7 is a block diagram of an example of a hardware structure of a sound signal processing apparatus based on a microphone array according to anther embodiment of the present disclosure.

In this embodiment, another sound signal processing apparatus 7000 based on a microphone array is also provided, as shown in FIG. 7, including:

- a memory 7010 configured to store an executable instruction;
- a processor 7020 configured to run the sound signal processing device to execute the sound signal processing method based on the microphone array as provided in this embodiment according to the control of the executable instruction.

In this embodiment, the sound signal processing apparatus 7000 may be a module with a sound signal processing function in smart devices with a microphone array such as a smart speaker, a TV box.

<Sound Signal Processing Device>

In this embodiment, a sound signal processing device 8000 is further provided, and the sound signal processing device 8000 includes:

- a microphone array 8010 configured to receive sound signals;
- the sound signal processing apparatus 6000 or the sound signal processing apparatus 7000 provided in this embodiment.

Figure 8:
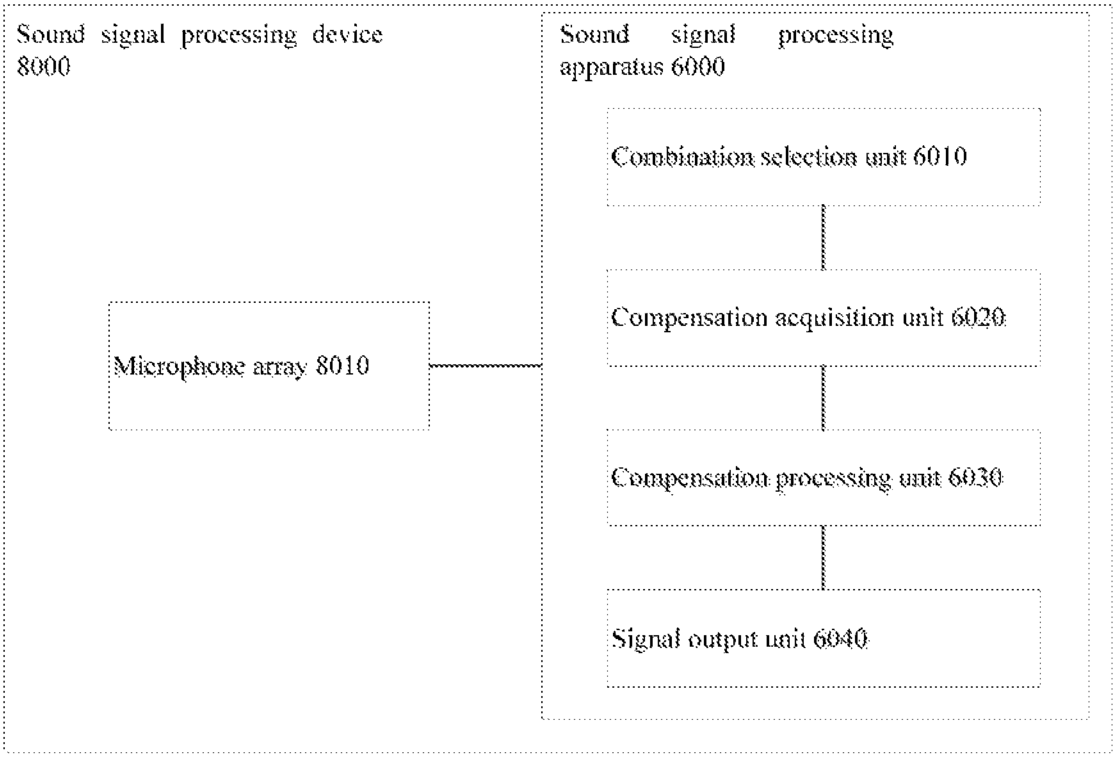
FIG. 8 is a schematic diagram of a hardware structure of a sound signal processing device according to an embodiment of the present disclosure.
Figure 9:
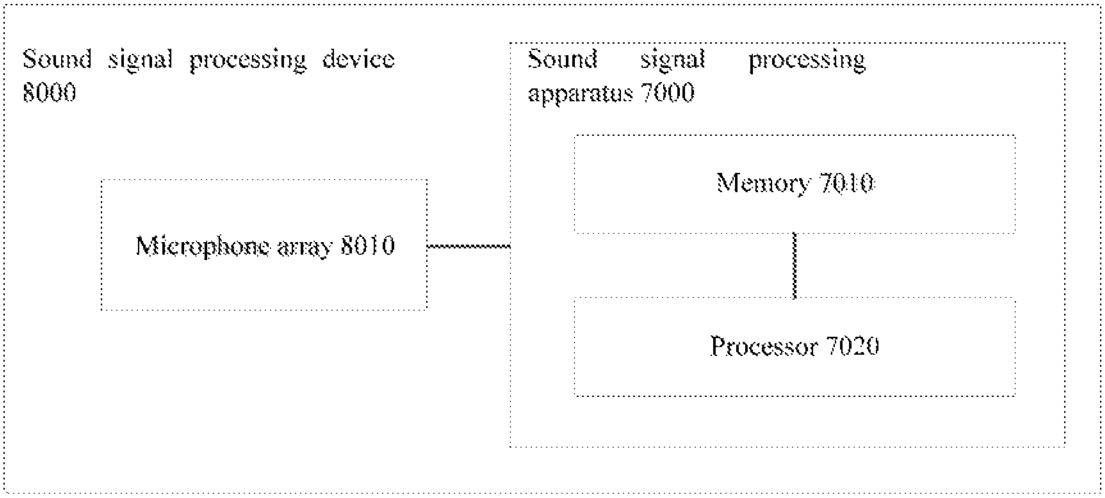
FIG. 9 is a schematic diagram of a hardware structure of a sound signal processing device according to anther embodiment of the present disclosure.

A sound signal processing device 8000 including the sound signal processing apparatus 6000 may be as shown in FIG. 8, and a sound signal processing device 8000 including the sound signal processing apparatus 7000 may be as shown in FIG. 9.

In this embodiment, the sound signal processing device 8000 is a smart device such as a smart speaker or a TV box with a microphone array. In this embodiment, the corresponding sound signal processing method may be implemented by the sound signal processing device 8000, which will not be repeated herein.

The sound signal processing method, apparatus and device based on the microphone array provided by the embodiments of the present disclosure has been described above with reference to the accompanying drawings and examples. For the microphone group configured to receive sound signals in the microphone array, by acquiring the signal compensation information corresponding to the microphone group and performing targeted signal compensation processing on each sound signal received by the microphone group, it is possible to eliminate the effect of sound wave diffraction or reflection caused by the obstacle structure between the microphones in the microphone group, so that the signal difference between the sound signals received by each microphone in the microphone group can satisfy the difference between the various sound signals received by the planar array, thus ensuring the performance of the sound signal processing (such as beamforming processing) based on the microphone array and correspondingly improving the sound recognition rate.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, comprising an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function-act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent.

Embodiments of the present disclosure have been presented for purposes of illustration, but are not intended to be exhaustive or limited to the embodiments disclosed. Numerous modifications and changes will be apparent to those skilled in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the present disclosure is defined by the appended claims.

The invention claimed is:

1. A sound signal processing method based on a microphone array, comprising:

selecting from the microphone array a target microphone group for receiving a sound signal from a target sound source, the target microphone group including a first microphone and at least one second microphone;

acquiring target compensation information corresponding to the target microphone group, the target compensation in formation including a signal compensation parameter for the at least one second microphone relative to the first microphone;

performing signal compensation processing on a second sound signal received by the at least one second microphone according to the target compensation information; and acquiring and outputting a target sound signal according to the second sound signal which has undergone the signal compensation processing and a first sound signal received by the first microphone;

wherein the acquiring target compensation information corresponding to the target microphone group comprises: acquiring a signal compensation information set of the microphone array, the acquiring a signal compensation information set of the microphone array comprises:

determining all microphone groups selectable in the microphone array;

acquiring, for each microphone group, a free transfer function and an obstacle transfer function of sound wave transmission from the first microphone to the at least one second microphone of the microphone group, wherein, the free transfer function is a transfer function in a free field environment corresponding to sound wave transmission from the first microphone to the at least one second microphone of the microphone group, whereas the obstacle transfer function is a transfer function in an obstacle structure environment corresponding to sound wave transmission from the first microphone to the at least one second microphone of the microphone group; and acquiring the signal compensation parameter of at least one second microphone in the microphone group relative to the first microphone as the signal compensation information of the microphone group, according to the free transfer function and the obstacle transfer function of each microphone group, thereby acquiring the signal compensation information set including the signal compensation information of each microphone group.

2. The method according to claim 1, wherein the signal compensation information set including signal compensation information of each microphone group selectable in the microphone array and including at least a microphone as the first microphone and at least a different microphone as the second microphone, the signal compensation information including at least the signal compensation parameters of the at least one second microphone in the microphone group relative to the first microphone; and the acquiring target compensation information corresponding to the target microphone group further comprises: selecting, from the signal compensation information set, signal compensation information corresponding to the target microphone group as the target compensation information.

3. The method according to claim 1, wherein the performing signal compensation processing on a second sound signal received by the at least one second microphone according to the target compensation information comprises:

performing frequency compensation on a frequency domain signal of the second sound signal according to the signal compensation parameter, thereby acquiring the second sound signal which has undergone compensation processing.

4. The method according to claim 1, wherein the acquiring and outputting a target sound signal according to the second sound signal which has undergone the signal compensation processing and a first sound signal received by the first microphone comprises:

performing beamforming processing on the second sound signal which has undergone the signal compensation processing and the first sound signal received by the first microphone, thereby acquiring and outputting the target sound signal.

5. The method according to claim 4, further comprising, after the beamforming processing:

performing signal de-compensation processing on a sound signal acquired through the beamforming processing according to the target compensation information, thereby acquiring and outputting the target sound signal.

6. The method according to claim 1, wherein the selecting from the microphone array a target microphone group for receiving a sound signal from a target sound source comprises:

determining an incident direction of the sound wave from the target sound source according to an initial sound signal from the target sound source received by the microphone array; and selecting the first microphone and the at least one second microphone corresponding to the incident direction of the sound wave from the microphone array, thereby acquiring the target microphone group.

7. A sound signal processing apparatus based on a microphone array, comprising:

a group selection unit configured to select a target microphone group from the microphone array for receiving a sound signal from a target sound source, the target microphone group including a first microphone and at least one second microphone;

a compensation acquisition unit configured to acquire target compensation information corresponding to the target microphone group, the target compensation information including a signal compensation parameter of the at least one second microphone relative to the first microphone;

a compensation processing unit configured to perform signal compensation processing on a second sound signal received by the at least one second microphone according to the target compensation information; and a signal outputting unit configured to acquire and output a target sound signal according to the second sound signal which has undergone the signal compensation processing and a first sound signal received by the first microphones;

wherein the compensation acquisition unit includes a compensation set acquisition sub-unit configured to acquire a signal compensation information set of the microphone array, and wherein the compensation set acquiring sub-unit includes:

a unit that can be configured to determine all the microphone groups selectable in the microphone array;

a unit that can be configured for each microphone group to acquire a free transfer function and an obstacle transfer function of sound wave transmission from the first microphone to each second microphone of the microphone group, wherein, the free transfer function is a transfer function in a free field environment corresponding to sound wave transmission from the first microphone to the at least one second microphone of the microphone group, whereas the obstacle transfer function is a transfer function in an obstacle structure environment corresponding to sound wave transmission from the first microphone to the at least one second microphone of the microphone group; and a unit that can be configured to acquire the signal compensation parameter of each second microphone in the microphone group relative to the first microphone as the signal compensation information of the microphone group according to the free transfer function and the obstacle transfer function of each microphone group, thereby acquiring the signal compensation information set including signal compensation information of each microphone group.

8. A sound signal processing apparatus based on a microphone array, comprising:

a memory configured to store executable instructions; and a processor configured to execute the sound signal processing method based on the microphone array of claim 1 under control of the executable instructions.

* * * * *